(12) United States Patent
Carroll

(10) Patent No.: US 9,163,393 B2
(45) Date of Patent: Oct. 20, 2015

(54) PANEL CONSTRUCTION DEVICE

(71) Applicant: Margie K. Carroll, Canton, GA (US)

(72) Inventor: Margie K. Carroll, Canton, GA (US)

( * ) Notice: Subject to any disclaimer, the term of this patent is extended or adjusted under 35 U.S.C. 154(b) by 0 days.

(21) Appl. No.: 14/212,883

(22) Filed: Mar. 14, 2014

(65) Prior Publication Data

US 2015/0259897 A1 Sep. 17, 2015

(51) Int. Cl.
| | | |
|---|---|---|
| E04B 1/343 | (2006.01) | |
| E04B 2/74 | (2006.01) | |
| E04B 1/48 | (2006.01) | |
| E04H 1/00 | (2006.01) | |

(52) U.S. Cl.
CPC .............. *E04B 1/34321* (2013.01); *E04B 1/48* (2013.01); *E04B 2/7405* (2013.01); *E04H 1/00* (2013.01)

(58) Field of Classification Search
CPC ... A63H 33/10; A63H 33/101; A63H 33/107; A63H 33/108; A63H 33/12; E04B 1/34321; E04B 1/48; E04B 1/00; E04B 2/7405
USPC .......... 52/582.1, 79.1, 127.7; 446/85, 86, 87, 446/105, 107, 108, 109, 110, 111, 112, 113, 446/114, 115, 116, 122
See application file for complete search history.

(56) References Cited

U.S. PATENT DOCUMENTS

| | | | | |
|---|---|---|---|---|
| 1,198,524 | A * | 9/1916 | Cunliffe | 220/6 |
| 1,914,845 | A * | 6/1933 | Cook | 229/199 |
| 2,319,641 | A * | 5/1943 | Speir, Jr. | 229/199 |
| 2,887,868 | A * | 5/1959 | Glidden | 52/381 |
| 3,078,615 | A * | 2/1963 | Smith | 446/478 |
| 3,246,828 | A * | 4/1966 | Branscum et al. | 220/4.34 |
| 3,405,835 | A * | 10/1968 | Eby | 220/4.34 |
| 3,481,093 | A * | 12/1969 | Davidson | 52/293.1 |
| 3,485,496 | A * | 12/1969 | Brunton | 273/157 R |
| 3,511,004 | A * | 5/1970 | Snellings | 52/270 |
| 3,872,620 | A * | 3/1975 | Daenen | 446/112 |
| 4,212,130 | A * | 7/1980 | Walker | 446/111 |
| 4,266,670 | A * | 5/1981 | Mykleby | 206/600 |
| 4,417,660 | A * | 11/1983 | Mason | 206/500 |
| 4,426,821 | A * | 1/1984 | Moore et al. | 52/646 |
| 4,523,418 | A * | 6/1985 | McLaughlin | 52/284 |
| 4,608,799 | A * | 9/1986 | Hasegawa | 52/578 |
| 4,635,411 | A * | 1/1987 | Kurzen | 52/71 |
| 5,014,476 | A * | 5/1991 | Leslie et al. | 52/220.2 |
| 5,036,634 | A * | 8/1991 | Lessard et al. | 52/79.1 |
| 5,193,683 | A * | 3/1993 | Key | 206/503 |
| 5,236,099 | A * | 8/1993 | Fties et al. | 220/4.31 |
| 5,333,970 | A * | 8/1994 | Heselden | 405/286 |
| 5,351,846 | A * | 10/1994 | Carter | 220/6 |
| 5,417,026 | A * | 5/1995 | Brumfield | 52/783.11 |

(Continued)

*Primary Examiner* — James Ference
(74) *Attorney, Agent, or Firm* — Bradley D. Crose; Crose Law LLC

(57) ABSTRACT

A panel construction device building set assembly includes: a plurality of building partitions, each building partition having: a first planar surface area; a second planar surface area generally parallel to the first surface area and generally equidistant apart from the first surface area at a predetermined distance; a plurality of flutes disposed within the first surface area and the second surface area and generally perpendicular to the first surface area and the second surface area; and a corrugated core disposed within each of the plurality of flutes, thereby to create a plurality of hollow channels within the flutes within the first surface area and the second surface area, and wherein each channel runs a continuous length within the first surface area and the second surface area; and a plurality of connectors with which to couple a pair of the building partitions.

20 Claims, 16 Drawing Sheets

(56) References Cited

U.S. PATENT DOCUMENTS

| | | | |
|---|---|---|---|
| 5,487,690 A * | 1/1996 | Stoffle et al. .................. 446/105 |
| 5,535,565 A * | 7/1996 | Majnaric et al. ................ 52/426 |
| 5,678,373 A * | 10/1997 | Franklin et al. ................. 52/439 |
| 5,706,620 A * | 1/1998 | De Zen ........................ 52/220.2 |
| 5,729,944 A * | 3/1998 | De Zen ........................... 52/439 |
| 5,868,252 A | 2/1999 | Oliff |
| 6,004,182 A * | 12/1999 | Pasin .......................... 446/105 |
| 6,079,175 A * | 6/2000 | Clear ........................... 52/404.1 |
| 6,269,826 B1 * | 8/2001 | Zheng ............................ 135/126 |
| 6,631,603 B2 * | 10/2003 | Zornes ......................... 52/782.1 |
| 6,631,821 B2 * | 10/2003 | Vourganas ..................... 220/1.5 |
| 6,672,799 B2 * | 1/2004 | Earl .............................. 405/111 |
| 6,783,058 B2 * | 8/2004 | Quaintance .................. 229/109 |
| 7,127,865 B2 * | 10/2006 | Douglas ..................... 52/745.13 |
| 7,146,773 B2 * | 12/2006 | Wilson ............................ 52/644 |
| 7,243,897 B2 * | 7/2007 | Huber et al. .................... 249/34 |
| 7,255,262 B2 | 8/2007 | Duyst |
| 7,293,530 B2 | 11/2007 | Italiano |
| 7,967,156 B2 | 6/2011 | Hsu |
| 8,209,916 B2 * | 7/2012 | Herron ........................... 52/79.5 |
| 2002/0170844 A1 * | 11/2002 | Stone et al. .................... 206/600 |
| 2006/0005497 A1 * | 1/2006 | Foell et al. .................... 52/589.1 |
| 2007/0160423 A1 * | 7/2007 | Heselden ........................ 405/19 |
| 2007/0193192 A1 * | 8/2007 | Huber ............................. 52/698 |
| 2007/0245640 A1 * | 10/2007 | Bergqvist ...................... 52/92.2 |
| 2008/0155929 A1 * | 7/2008 | Herron ......................... 52/582.1 |
| 2008/0247830 A1 * | 10/2008 | Heselden ....................... 405/273 |
| 2008/0279634 A1 * | 11/2008 | Heselden ....................... 405/114 |
| 2009/0133354 A1 * | 5/2009 | Spear et al. .................... 52/588.1 |
| 2009/0202308 A1 * | 8/2009 | Heselden ...................... 405/273 |
| 2010/0064627 A1 * | 3/2010 | Heselden ................... 52/745.09 |
| 2010/0187295 A1 | 7/2010 | Spivey, Sr. |
| 2010/0301057 A1 * | 12/2010 | Tattam et al. ............. 220/592.25 |
| 2011/0132801 A1 * | 6/2011 | Elder ............................. 206/600 |
| 2012/0085062 A1 * | 4/2012 | Neumayr ........................ 52/578 |

\* cited by examiner

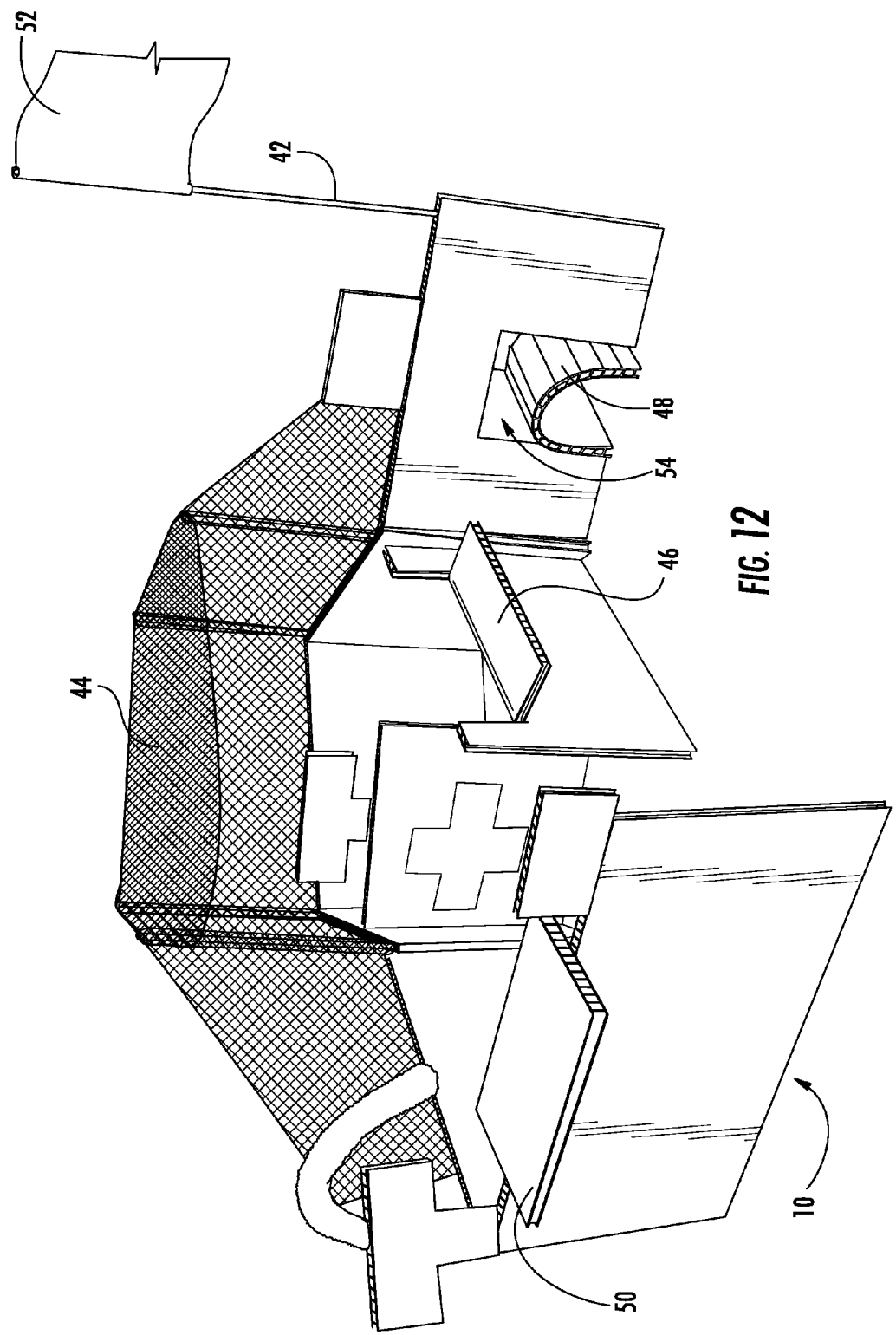

PANEL CONSTRUCTION DEVICE

FIELD OF THE INVENTION

The technology described herein relates generally to the fields of panel construction systems, building toys, building blocks, toy constructions sets, and the like. More specifically the technology described herein relates to a panel construction device having interconnectable building elements for the creation of dollhouses, forts, pet containment systems, beach canopies, partition-based spaces, and so forth. Furthermore, technology described herein relates to a panel construction device having building elements that enable the user to fashion a variety of configurations based on design choice and other factors.

BACKGROUND OF THE INVENTION

Certain toy constructions sets and building toys are known in the background art to enable one to build various structures. Known devices and systems are inefficient and limiting in many ways. Others have attempted to overcome these deficiencies with building sets and construction sets having various constructions; however, these devices also have been found to have various shortcomings and deficiencies as well.

Related utility patents known in the art include the following:

U.S. Pat. No. 7,293,530, issued to Italiano on Nov. 13, 2007, discloses a lightweight, portable and expandable small animal enclosure.

U.S. Pat. No. 3,872,620, issued to Daenen on Mar. 25, 1975, discloses a panel construction toy.

U.S. Pat. No. 5,865,252, issued to Oliff on Feb. 9, 1999, discloses a divider panel with anchor panel window architecture.

U.S. Pat. No. 7,255,262, issued to Duyst on Aug. 14, 2007, discloses a single piece bulk bin blank and container.

U.S. Pat. No. 7,967,156 issued to Hsu on Jun. 28, 2011, discloses a storage rack.

Related U.S. patent application publications known in the art include the following:

U.S. Patent Application Publication No. 2010/0187295, filed by Spivey, Sr., et al. and published on Jul. 29, 2010, discloses a carton with interlocking divider.

The foregoing patent and other information reflect the state of the art of which the inventor is aware and are tendered with a view toward discharging the inventor's acknowledged duty of candor in disclosing information that may be pertinent to the patentability of the technology described herein. It is respectfully stipulated, however, that the foregoing patent and other information do not teach or render obvious, singly or when considered in combination, the inventor's claimed invention.

BRIEF SUMMARY OF THE INVENTION

In various exemplary embodiments, the technology described herein provides a panel construction device having interconnectable building elements for the creation of dollhouses, forts, pet containment systems, beach canopies, partition-based spaces, and so forth. Furthermore, technology described herein provides a panel construction device having building elements that enable the user to fashion a variety of configurations based on design choice and other factors.

In one exemplary embodiment, the technology described herein provides a panel construction device building set assembly. The panel construction device building set assembly includes: a plurality of building partitions, each building partition having: a first planar surface area; a second planar surface area generally parallel to the first surface area and generally equidistant apart from the first surface area at a predetermined distance; a plurality of flutes disposed within the first surface area and the second surface area and generally perpendicular to the first surface area and the second surface area; and a corrugated core disposed within each of the plurality of flutes, thereby to create a plurality of hollow channels within the flutes within the first surface area and the second surface area, and wherein each channel runs a continuous length within the first surface area and the second surface area; and a plurality of connectors with which to couple a pair of the building partitions one to another.

In at least one embodiment of panel construction device building set assembly, a first portion of the plurality of connectors with which to couple a pair of the building partitions one to another is pre-formed in a generally "U" shaped form having two end portions generally parallel one to another, each end for placement within one of the plurality of hollow channels and with which to couple a pair of the building partitions one to another.

In at least one embodiment of panel construction device building set assembly, a second portion of the plurality of connectors with which to couple a pair of the building partitions one to another is pre-formed in a generally "L" shaped form having two end portions generally formed at a ninety degree right angle one to another, each end for placement within one of the plurality of hollow channels and with which to couple a pair of the building partitions one to another.

In at least one embodiment of panel construction device building set assembly, a third portion of the plurality of connectors with which to couple a pair of the building partitions one to another further comprises a horizontal aperture formed perpendicular to one end and extended across a width of the end, thereby configured for receipt and pass through of an item placed through the aperture.

In at least one embodiment of panel construction device building set assembly, the assembly also includes a plurality of flexible spacing elements, each flexible spacing element configured for placement through each connector having an aperture for receipt of an item, and each flexible spacing element configured to securely hold the connector within one of the plurality of hollow channels.

In at least one embodiment of panel construction device building set assembly the plurality of connectors are aluminum.

In at least one embodiment of panel construction device building set assembly the plurality of connectors are plastic.

In at least one embodiment of panel construction device building set assembly the plurality of connectors are powder-coated.

In at least one embodiment of panel construction device building set assembly the plurality of flexible spacing elements are foam.

In at least one embodiment of panel construction device building set assembly the plurality of flexible spacing elements are rubber.

In at least one embodiment of panel construction device building set assembly the plurality of building partitions comprise plastic.

In at least one embodiment of panel construction device building set assembly, the assembly further includes: a first fin defined by a first edge of the first planar surface area; and a second fin defined by a second edge of the second planar surface area. Additional first fins are created upon a cut made along a first length of the first planar surface area between flutes. Additional second fins are created upon a cut made along a second length of the second planar surface area between flutes.

In at least one embodiment of panel construction device building set assembly, the assembly also includes a gate configuration formed by at least two building partitions generally adjacent and hingedly connected by a pair of connectors, a first connector to couple the at least two building partitions at a top end and a second connector to couple the at least two building partitions at a bottom end.

In at least one embodiment of panel construction device building set assembly, the assembly further includes a plurality of poles to extend within the multiplicity of corrugated flutes having corrugated cores between the flutes and to extend the panel construction device building set assembly vertically.

In at least one embodiment of panel construction device building set assembly, the assembly also includes a canopy to place upon panel construction device building set assembly and provide a covering.

In at least one embodiment of panel construction device building set assembly, the assembly further includes a window cut-out defined within one or more of the plurality of building partitions.

In at least one embodiment of panel construction device building set assembly, wherein at least one of the building partitions includes a plurality of vertical cuts on one of either of the first planar surface area or the second planar surface area, the cuts extended from end to end and placed between the plurality of flutes, such that the building partition has greater flexibility and bendability.

In at least one embodiment of panel construction device building set assembly, the assembly also includes a floor surface.

In another exemplary embodiment a panel construction device building set assembly is disclosed. This panel construction device building set assembly includes: a plurality of building partitions, each building partition having: a first planar surface area; a second planar surface area generally parallel to the first surface area and generally equidistant apart from the first surface area at a predetermined distance; a plurality of flutes disposed within the first surface area and the second surface area and generally perpendicular to the first surface area and the second surface area; a corrugated core disposed within each of the plurality of flutes, thereby to create a plurality of hollow channels within the flutes within the first surface area and the second surface area, and wherein each channel runs a continuous length within the first surface area and the second surface area; a plurality of connectors with which to couple a pair of the building partitions one to another; a horizontal aperture defined with a third portion of the plurality of connectors and formed perpendicular to one end and extended across a width of the end, thereby configured for receipt and pass through of an item placed through the aperture; and a plurality of flexible spacing elements, each flexible spacing element configured for placement through each connector having an aperture for receipt of an item, and each flexible spacing element configured to securely hold the connector within one of the plurality of hollow channels.

In another exemplary embodiment a panel construction device building set assembly is disclosed. This panel construction device building set assembly includes: a plurality of building partitions, each building partition having: a first planar surface area; a second planar surface area generally parallel to the first surface area and generally equidistant apart from the first surface area at a predetermined distance; a plurality of flutes disposed within the first surface area and the second surface area and generally perpendicular to the first surface area and the second surface area; a corrugated core disposed within each of the plurality of flutes, thereby to create a plurality of hollow channels within the flutes within the first surface area and the second surface area, and wherein each channel runs a continuous length within the first surface area and the second surface area; a plurality of connectors with which to couple a pair of the building partitions one to another; a horizontal aperture defined with a third portion of the plurality of connectors and formed perpendicular to one end and extended across a width of the end, thereby configured for receipt and pass through of an item placed through the aperture; a plurality of flexible spacing elements, each flexible spacing element configured for placement through each connector having an aperture for receipt of an item, and each flexible spacing element configured to securely hold the connector within one of the plurality of hollow channels; a plurality of poles to extend within the multiplicity of corrugated flutes having corrugated cores between the flutes and to extend the panel construction device building set assembly vertically; and a canopy to place upon panel construction device building set assembly and provide a covering; wherein a first portion of the plurality of connectors with which to couple a pair of the building partitions one to another is pre-formed in a generally "U" shaped form having two end portions generally parallel one to another, each end for placement within one of the plurality of hollow channels and with which to couple a pair of the building partitions one to another; wherein a second portion of the plurality of connectors with which to couple a pair of the building partitions one to another is pre-formed in a generally "L" shaped form having two end portions generally formed at a ninety degree right angle one to another, each end for placement within one of the plurality of hollow channels and with which to couple a pair of the building partitions one to another; and wherein a third portion of the plurality of connectors with which to couple a pair of the building partitions one to another further comprises a horizontal aperture formed perpendicular to one end and extended across a width of the end, thereby configured for receipt and pass through of an item placed through the aperture.

Advantageously, the technology described herein provides a customizable, partition based space for use as a children's playhouse, pet enclosure, privacy screen for public spaces such as the beach, school day care facilities, forts, dollhouses, and so forth. Also advantageously, the technology described herein relates to system having building elements that enable the user to fashion a variety of configurations based on design choice and other factors.

There has thus been outlined, rather broadly, the more important features of the technology in order that the detailed description thereof that follows may be better understood, and in order that the present contribution to the art may be better appreciated. There are additional features of the technology that will be described hereinafter and which will form the subject matter of the claims appended hereto. In this respect, before explaining at least one embodiment of the technology in detail, it is to be understood that the invention is not limited in its application to the details of construction and to the arrangements of the components set forth in the following description or illustrated in the drawings. The technology described herein is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the technology described herein.

Further objects and advantages of the technology described herein will be apparent from the following detailed description of a presently preferred embodiment which is illustrated schematically in the accompanying drawings.

BRIEF DESCRIPTION OF THE DRAWINGS

The technology described herein is illustrated with reference to the various drawings, in which like reference numbers denote like device components and/or method steps, respectively, and in which:

FIG. 12 is a front perspective view of a configuration with the panel construction device, illustrating, in particular, table tops, a tunnel, a flag, a covered space, and windows, according to an embodiment of the technology described herein;

DETAILED DESCRIPTION OF THE INVENTION

Before describing the disclosed embodiments of this technology in detail, it is to be understood that the technology is not limited in its application to the details of the particular arrangement shown here since the technology described is capable of other embodiments. Also, the terminology used herein is for the purpose of description and not of limitation.

In various exemplary embodiments, the technology described herein provides a panel construction device having interconnectable building elements for the creation of dollhouses, forts, pet containment systems, beach canopies, partition-based spaces, and so forth. Furthermore, technology described herein provides a panel construction device having building elements that enable the user to fashion a variety of configurations based on design choice and other factors.

Referring now to the figures, a panel construction device building set assembly 10 is shown. The panel construction device building set assembly 10 includes multiple building partitions.

Figure 1:
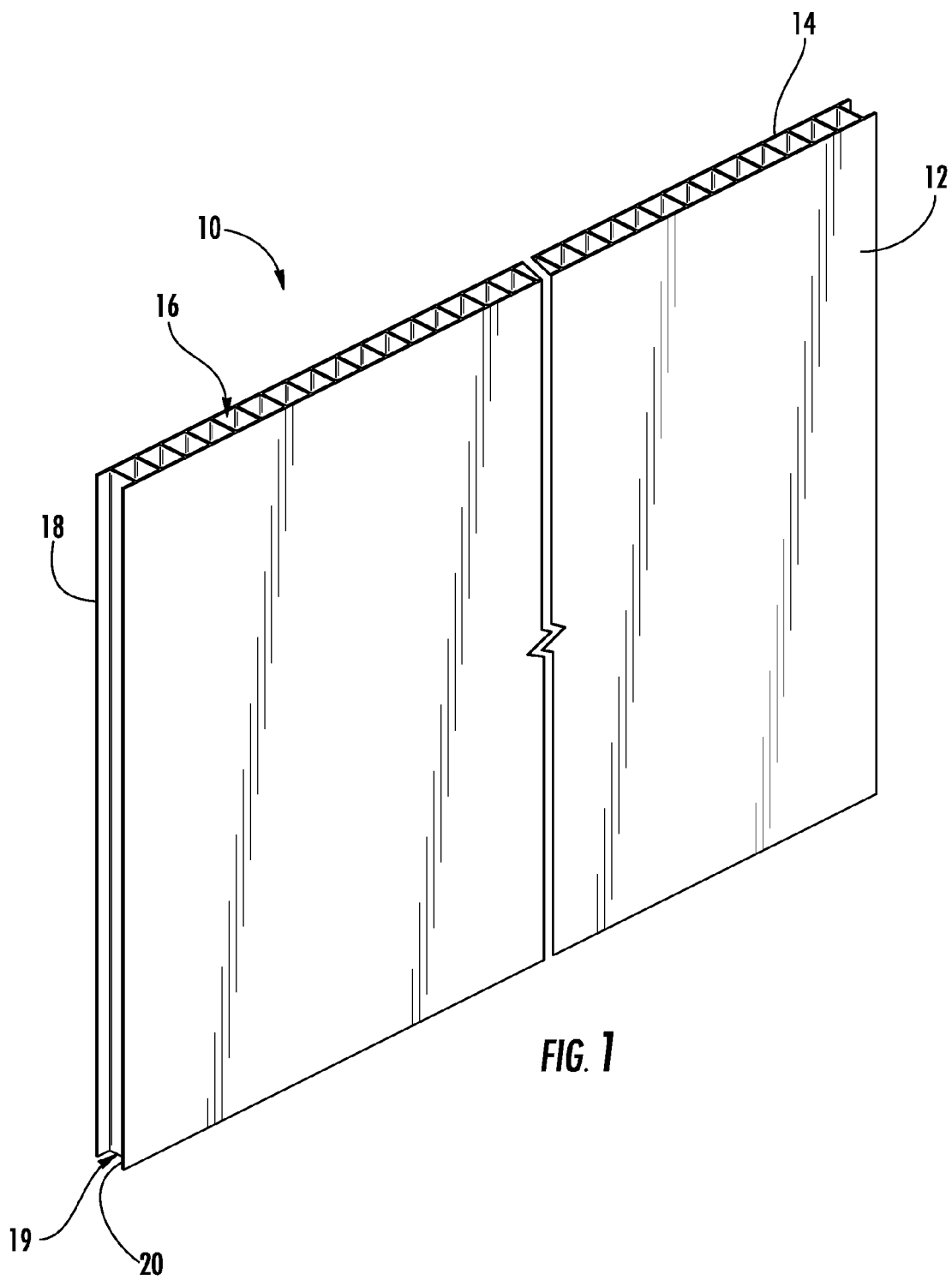
FIG. 1 is a front perspective view of a partition for use within a panel construction device, illustrating, in particular, an outside surface and inside surface covering a multiplicity of corrugated flutes having corrugated cores between the flutes, and having inside and outside fins at the ends, according to an embodiment of the technology described herein.
Figure 2:
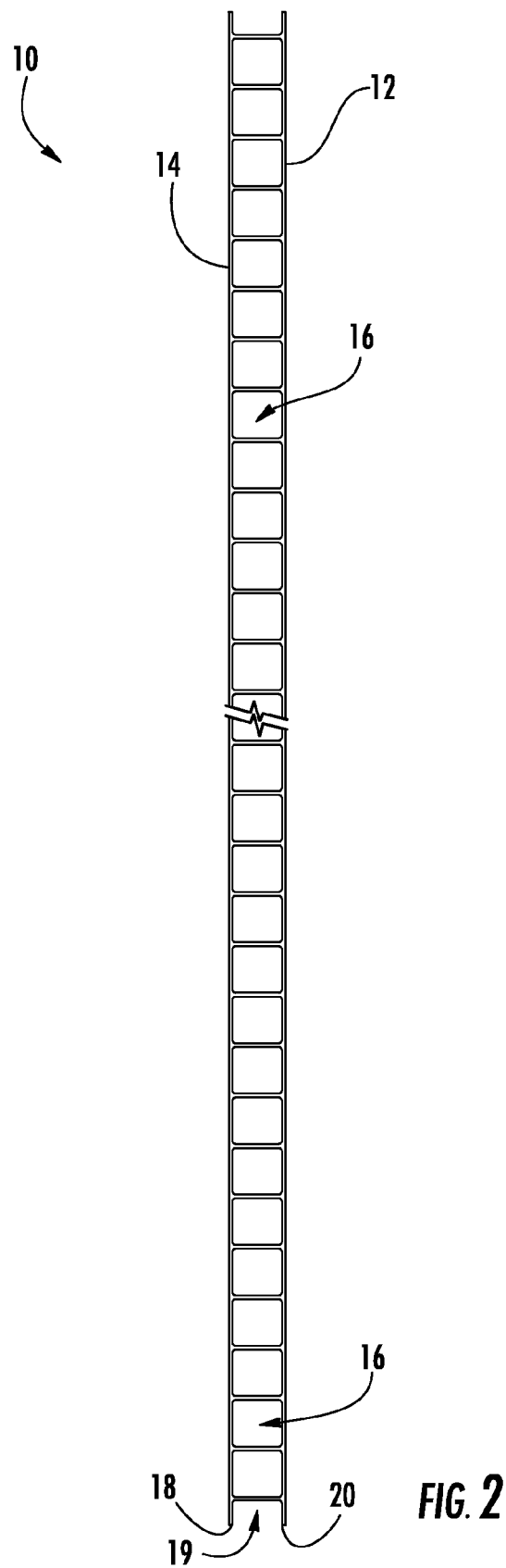
FIG. 2 is a cross-sectional top view of the partition depicted in FIG. 1, illustrating, in particular, the multiplicity of corrugated flutes having corrugated cores between the flutes, according to an embodiment of the technology described herein.

Referring now to FIGS. 1 and 2, specifically, elements of the building partitions are depicted. Each building partition depicted in FIGS. 1 and 2 includes a first planar surface area 12 and a second planar surface area 14. The second planar surface area 14 is generally parallel to the first planar surface area 12 and generally equidistant apart from the first surface area 12 at a predetermined distance.

The building partitions also include multiple flutes 19 disposed within the first surface area 12 and the second surface area 14. The flutes 19 are generally perpendicular to the first surface area 12 and the second surface area 14.

The building partitions also include a corrugated core 16 disposed between each pair of the flutes 19. This thereby creates multiple hollow channels between the flutes 19 within the first surface area 12 and the second surface area 14. Each hollow channel runs a continuous length within the first surface area 12 and the second surface area 14. The corrugated cores 16 are depicted well in FIG. 2, a top-down view of a building partition, illustrating the multiple hollow channels between the flutes 19 within the first surface area 12 and the second surface area 14.

In at least one embodiment of panel construction device building set assembly 10, the assembly further includes a first fin 18 defined by a first edge of the first planar surface area 14 and a second fin 20 defined by a second edge of the second planar surface area 12. Additional first fins 18 are created upon a cut made along a first length of the first planar surface area 14 between flutes 19. Additional second fins 20 are created upon a cut made along a second length of the second planar surface area 12 between flutes 19.

In various embodiments the building partitions are plastic. In at least one embodiment the building partitions 10 are corrugated plastic. In at least one embodiment, all of the elements of the building partition 10 described above are collectively and integrally formed as a single piece. Such single pieces can be sold and distributed in packs and in combination with other elements described below in various building sets.

Figure 3:
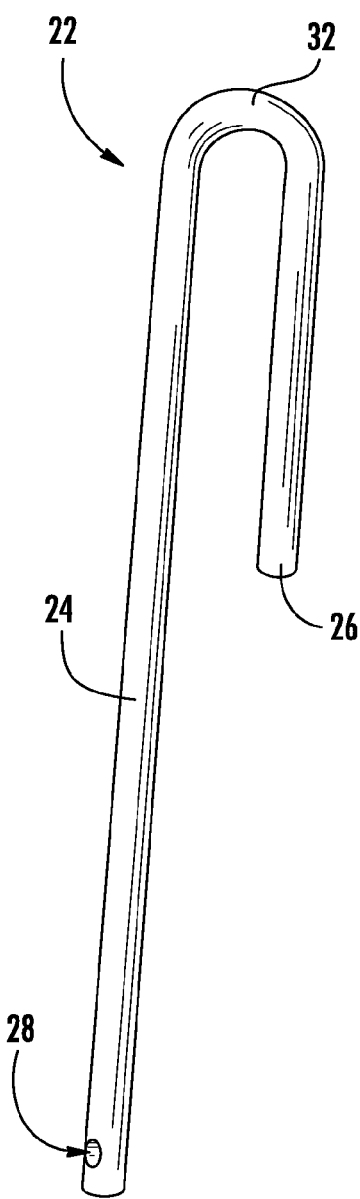
FIG. 3 is a front perspective view of a connector which is used to couple a pair of the partitions depicted in FIG. 1, by placement of the connector within the corrugated flutes having corrugated cores between the flutes, according to an embodiment of the technology described herein.
Figure 4:
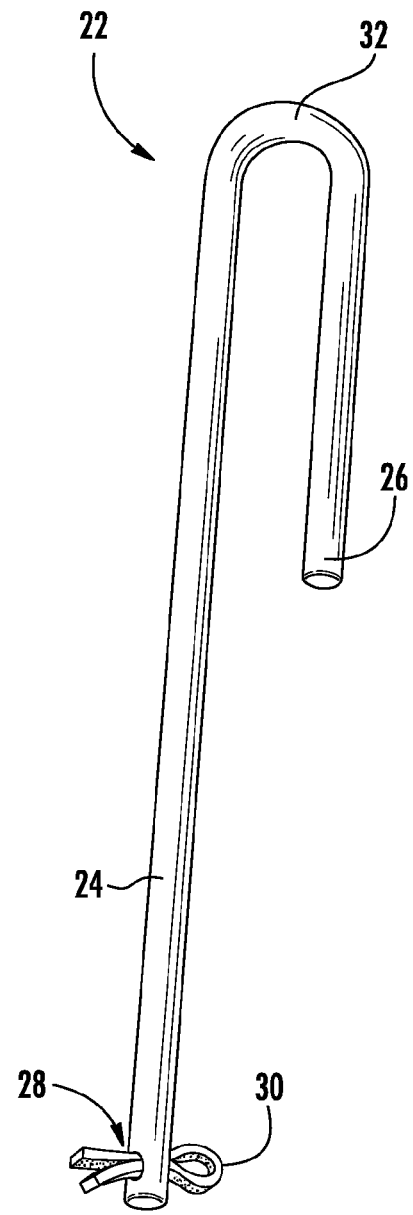
FIG. 4 is a front perspective view of the connector depicted in FIG. 3, further illustrating, in particular, foam, rubber, of the like disposed within the hole to create a resistance to movement of the connector within the corrugated core, according to an embodiment of the technology described herein.

The panel construction device building set assembly 10 includes multiple connectors 22 with which to couple a pair of the building partitions 10 one to another. Reference is now made to FIGS. 3 and 4 specifically, which depict connectors 22 of various embodiments. In at least one embodiment of panel construction device building set assembly 10, the connectors are aluminum. In at least one embodiment of panel construction device building set assembly 10, the connectors are plastic. In at least one embodiment of panel construction device building set assembly 10, the connectors are powder-coated. Coated connectors 22 are useful to protect the hand as well as to be more "child-safe" for use by children.

Figure 5:
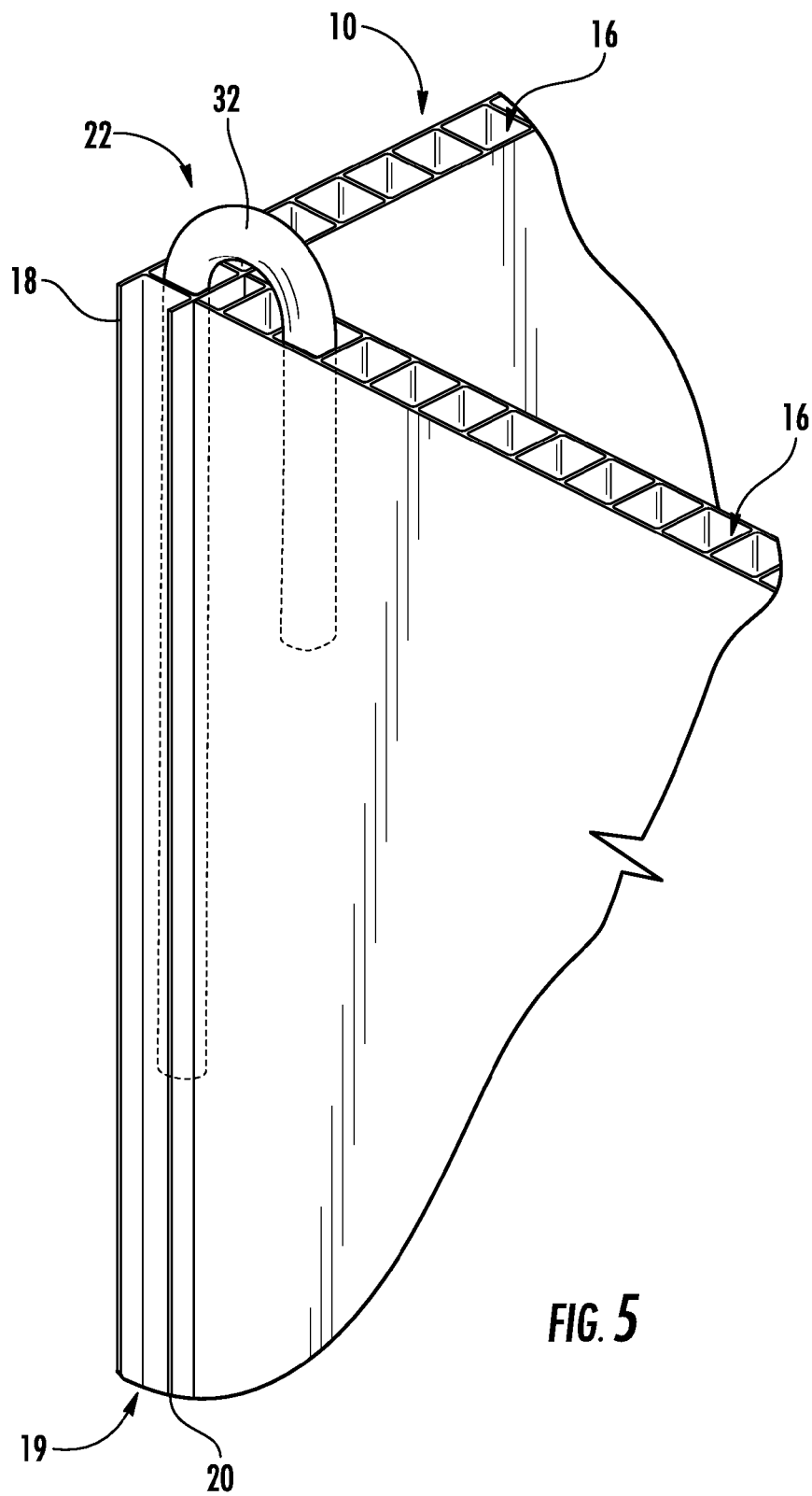
FIG. 5 is a front perspective view of a pair of the partition depicted in FIG. 1, aligned perpendicularly, and illustrating, in particular, the coupling of the partitions with the connector depicted in FIG. 3, according to an embodiment of the technology described herein.
Figure 9:
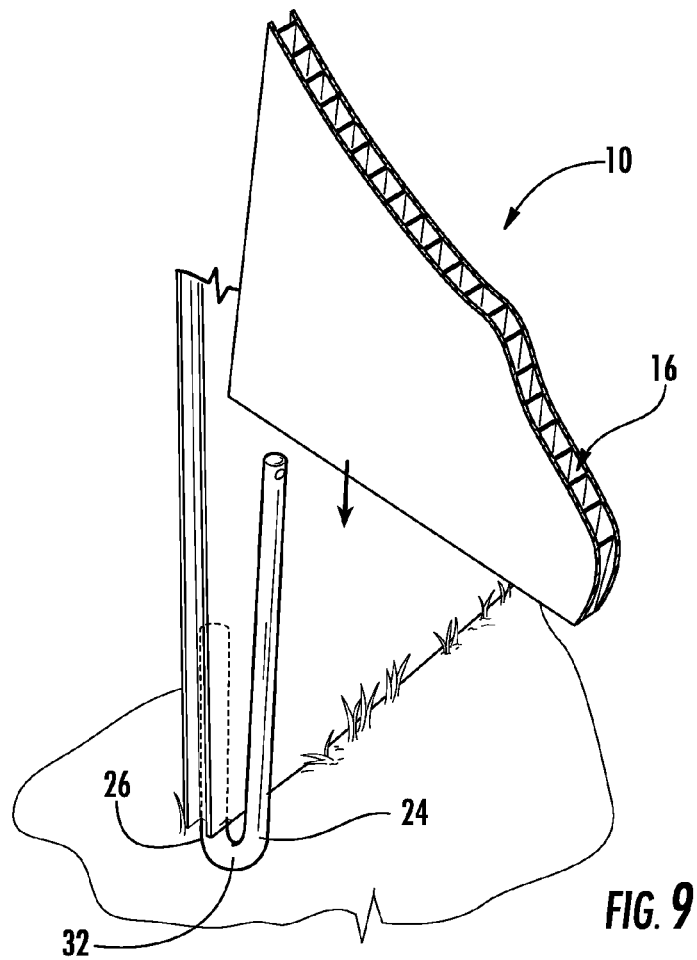
FIG. 9 is a front perspective view of a pair of the partitions depicted in FIG. 1, aligned perpendicularly, and illustrating, in particular, the coupling of the partitions with the connector depicted in FIG. 3 from an underside, or at a ground level, according to an embodiment of the technology described herein.

In at least one embodiment of panel construction device building set assembly 10, a first portion of the plurality of connectors 22 with which to couple a pair of the building partitions one to another is pre-formed in a generally "U" shaped form having two end portions 24, 26 generally parallel one to another, about bend 32, each end 24, 26 for placement within one of the plurality of hollow channels and with which to couple a pair of the building partitions one to another, such as depicted in FIG. 5, from a top-down connection, and such as depicted in FIG. 9, from a bottom-up connection, such as at a floor surface or ground level. This provides stability to the created structure and reduces sliding and movement along a floor surface or ground level.

Figure 11:
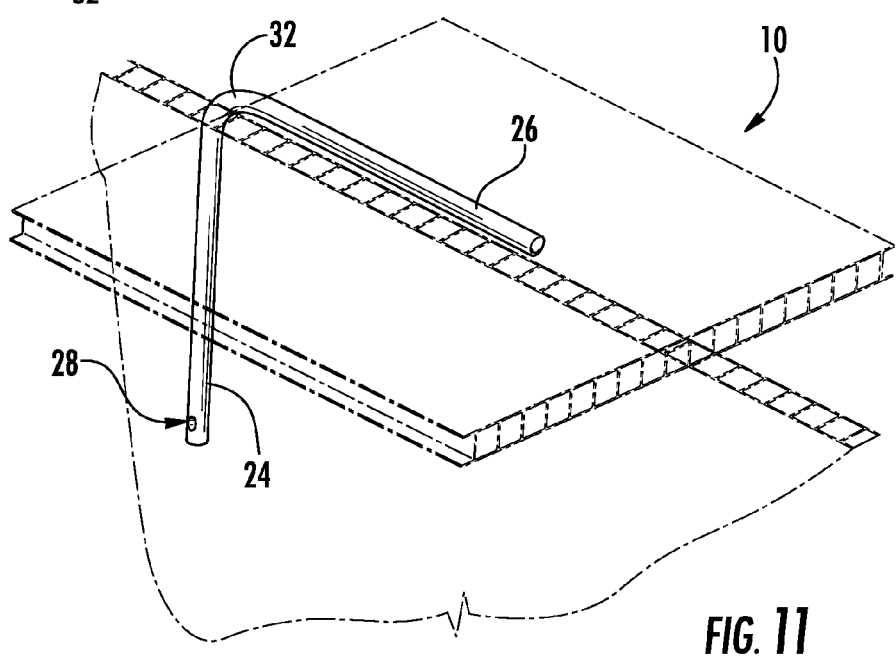
FIG. 11 is a front perspective view of a pair of the partitions depicted in FIG. 1, aligned perpendicularly, and illustrating, in particular, the coupling of the partitions with the connector depicted in FIG. 3 but with the connector formed at a right angle, useful for creating a gate effect, according to an embodiment of the technology described herein.

In at least one embodiment of panel construction device building set assembly 10, a second portion of the plurality of connectors 22 with which to couple a pair of the building partitions one to another is pre-formed in a generally "L" shaped form (see FIG. 11, for example) having two end portions 24, 26 generally formed at a ninety degree right angle one to another about bend 32, each end for placement within one of the plurality of hollow channels and with which to couple a pair of the building partitions one to another, as depicted in FIG. 11. This configuration can aid in the creation of shelves 46, table tops 50, horizontal platforms, and the like (as depicted in FIG. 12, for example).

In at least one embodiment of panel construction device building set assembly 10, a third portion of the plurality of connectors 22 with which to couple a pair of the building partitions one to another further comprises a horizontal aperture 28. The horizontal aperture 28 is formed perpendicular to one end and extended across a width of the end 24, thereby configured for receipt and pass through of an item placed through the aperture 28. The horizontal aperture 28 is on both connector ends 24, 26 in at least one embodiment.

Referring now to FIG. 5, a pair of building partitions 10 are depicted. A connector 22 is inserted (one end 24 into first partition, a second end 24 into a second partition) to couple the building partitions 10 one to another. The connector 22 are placed easily with the corrugated cores 16 have continuous hollow channels between flutes 19. A connector 22 can be removed by pulling on the bend 32 section of the connector 22. As depicted in FIG. 5, two building partitions 10 are coupled at one end of each partition 10, as noted by fins 18, 19. However, the connector 22 can connect to a corrugated cores 16 not at an end section of a building partition 10.

Figure 6:
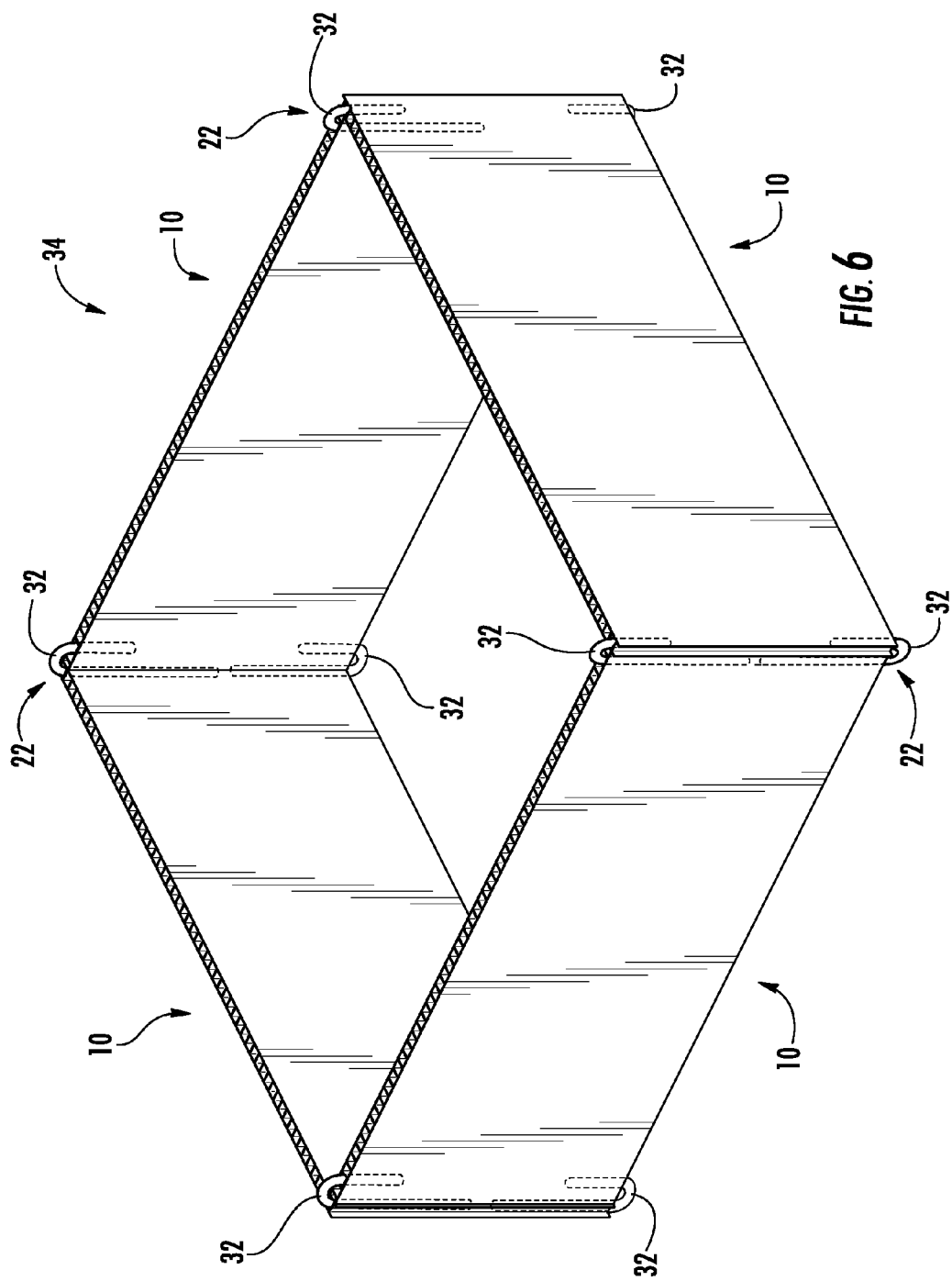
FIG. 6 is a front perspective view of four of the partitions depicted in FIG. 1, aligned perpendicularly, and illustrating, in particular, the coupling of the partitions with the connector depicted in FIG. 3, on both a top edge and a bottom edge, according to an embodiment of the technology described herein.

Referring now to FIG. 6, set-up configuration 34 is depicted. The set-up configuration 34 includes four of the building partitions 10 formed generally in a square pattern. The coupling of the building partitions 10 is made with connectors 22. As depicted eight connectors are used, two in each corner, one at a top portion of the corner and one a bottom portion of the corner. A set-up configuration 34 can be used for creating a fort, pet enclosure, or the like, as selectively determined by the user.

In at least one embodiment of panel construction device building set assembly 10, the assembly also includes flexible spacing elements 30, such as that depicted in FIG. 4. Each flexible spacing element 30 is configured for placement through each connector 22 having an aperture 28 for receipt of an item. Each flexible spacing element 30 configured to securely hold the connector 22 within one of the plurality of hollow channels.

In at least one embodiment of panel construction device building set assembly 10 the flexible spacing elements 30 are foam. In at least one embodiment of panel construction device building set assembly 10 the flexible spacing elements 30 are rubber. As such, once a connector 22 is placed with a hollow channel of the corrugated core 16, the flexible spacing element 30, whether foam, rubber, or the like, is useful to hold the connector in place causing a resistance to movement and significantly reduce sliding. Such a connector 22 utilizing a flexible spacing elements 30 can still be easily removed by pulling on bend 32 of the connector 22 and pulling outwardly from the partition 10.

Figure 7:
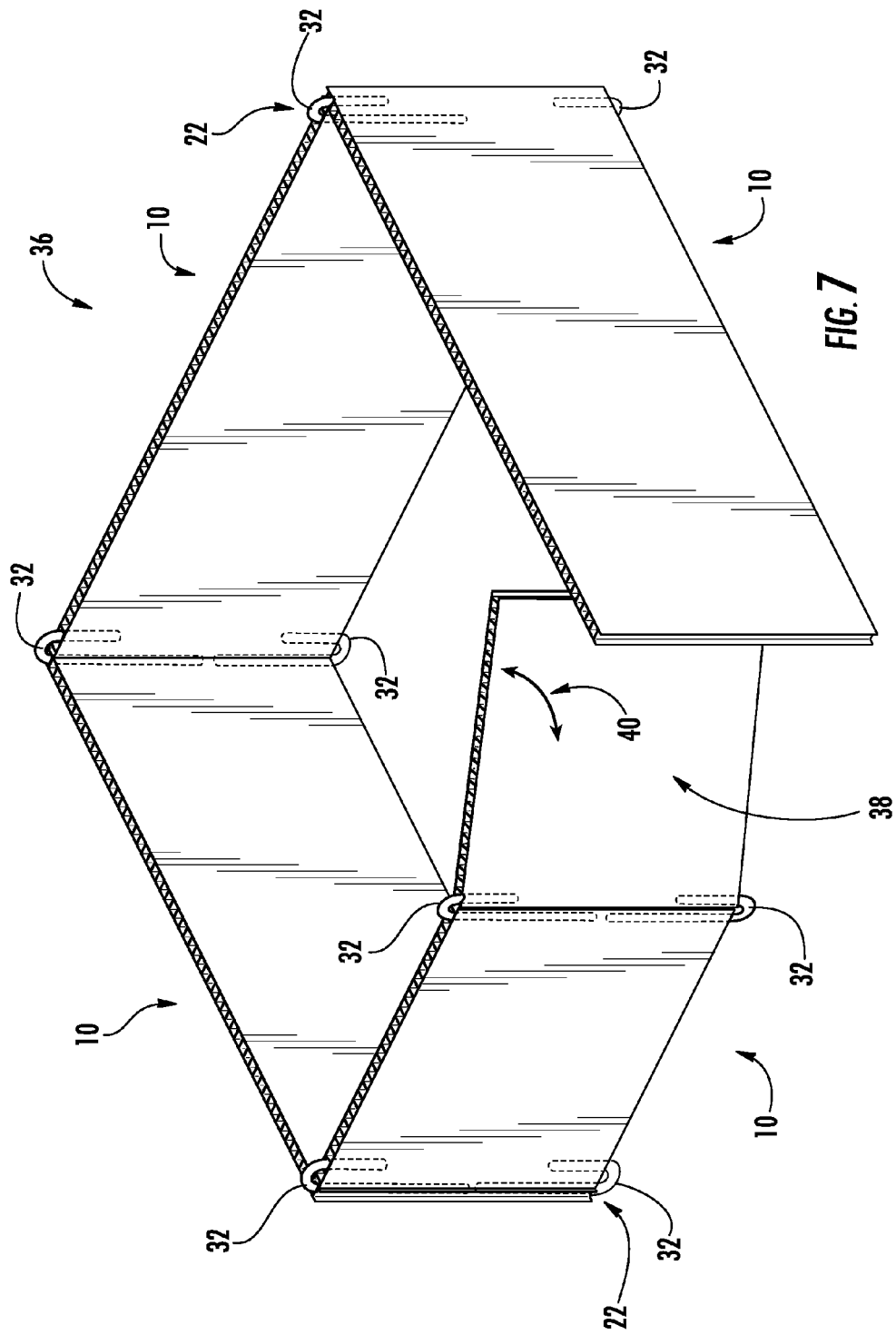
FIG. 7 is a front perspective view of four of the partitions depicted in FIG. 1, aligned perpendicularly, and illustrating, in particular, the coupling of the partitions with the connector depicted in FIG. 3, on both a top edge and a bottom edge, and further illustrating a swinging gate made from one partition, according to an embodiment of the technology described herein.

Referring now to FIG. 7, in at least one embodiment of panel construction device building set assembly 10, the assembly also includes a set-up formation 36 including a gate configuration 38. A gate formation 38 is depicted in FIG. 7, for example. The gate formation 38 is formed by at least two building partitions generally adjacent and hingedly connected by a pair of connectors 22, a first connector 22 to couple the at least two building partitions at a top end and a second connector 22 to couple the at least two building partitions at a bottom end. The gate formation 38 includes a gate 38 that swings about an axis along the connectors and moves as depicted in element 40, a gate swing radius.

Figure 8:
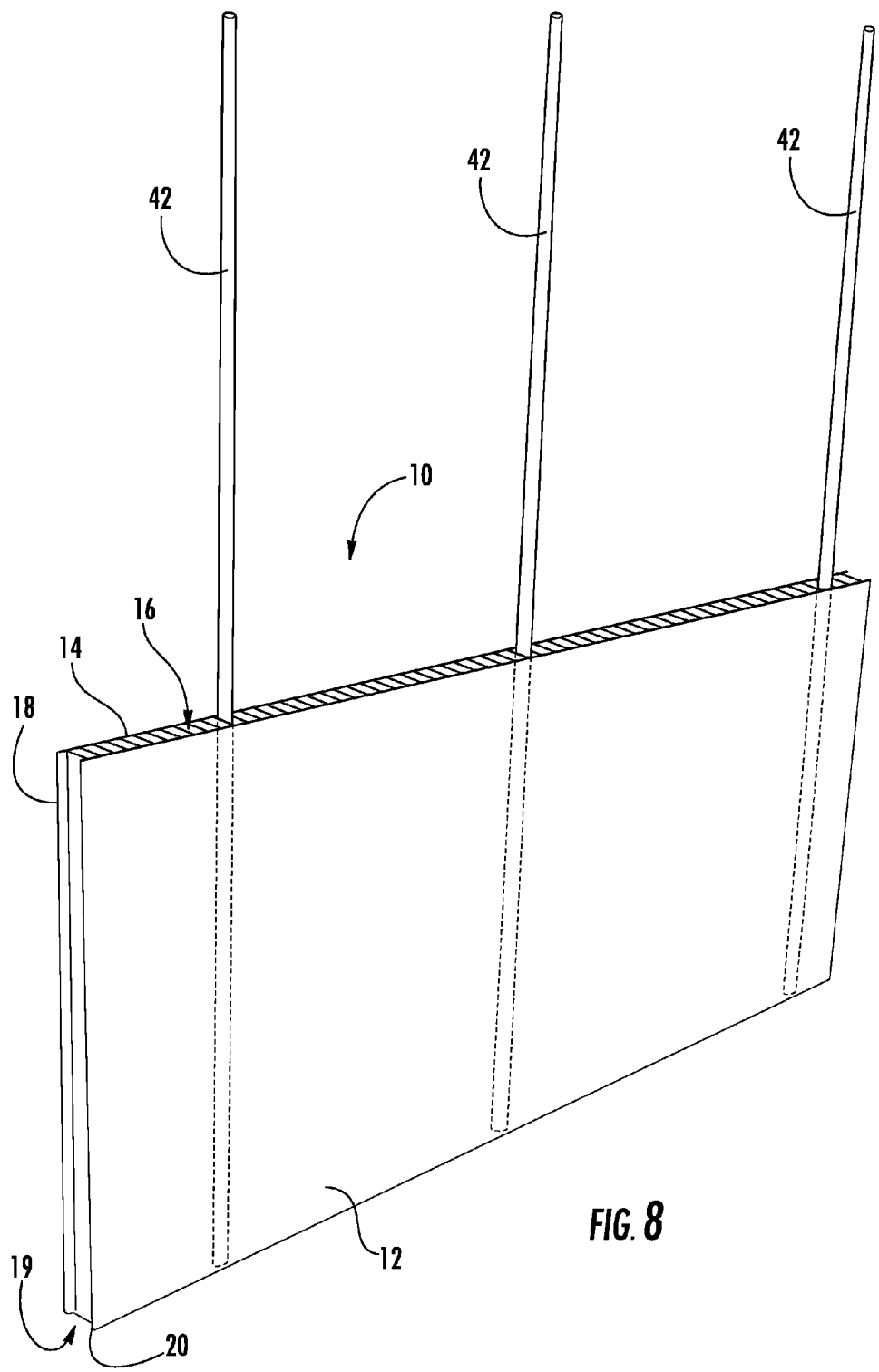
FIG. 8 is a front perspective view of a partition for use within a panel construction device, as depicted in FIG. 1, and further illustrating, in particular, poles extended within the multiplicity of corrugated flutes having corrugated cores between the flutes, according to an embodiment of the technology described herein.

Referring now to FIG. 8, in at least one embodiment of panel construction device building set assembly, the assembly further includes a multiplicity of poles 42. Poles 42 are depicted specifically in FIG. 8. The poles 42 are configured to extend within the multiplicity of corrugated flutes 19 having corrugated cores 16 between the flutes 19 and to extend the panel construction device building set assembly 10 vertically. Multiple poles 42 can be utilized.

Figure 15:
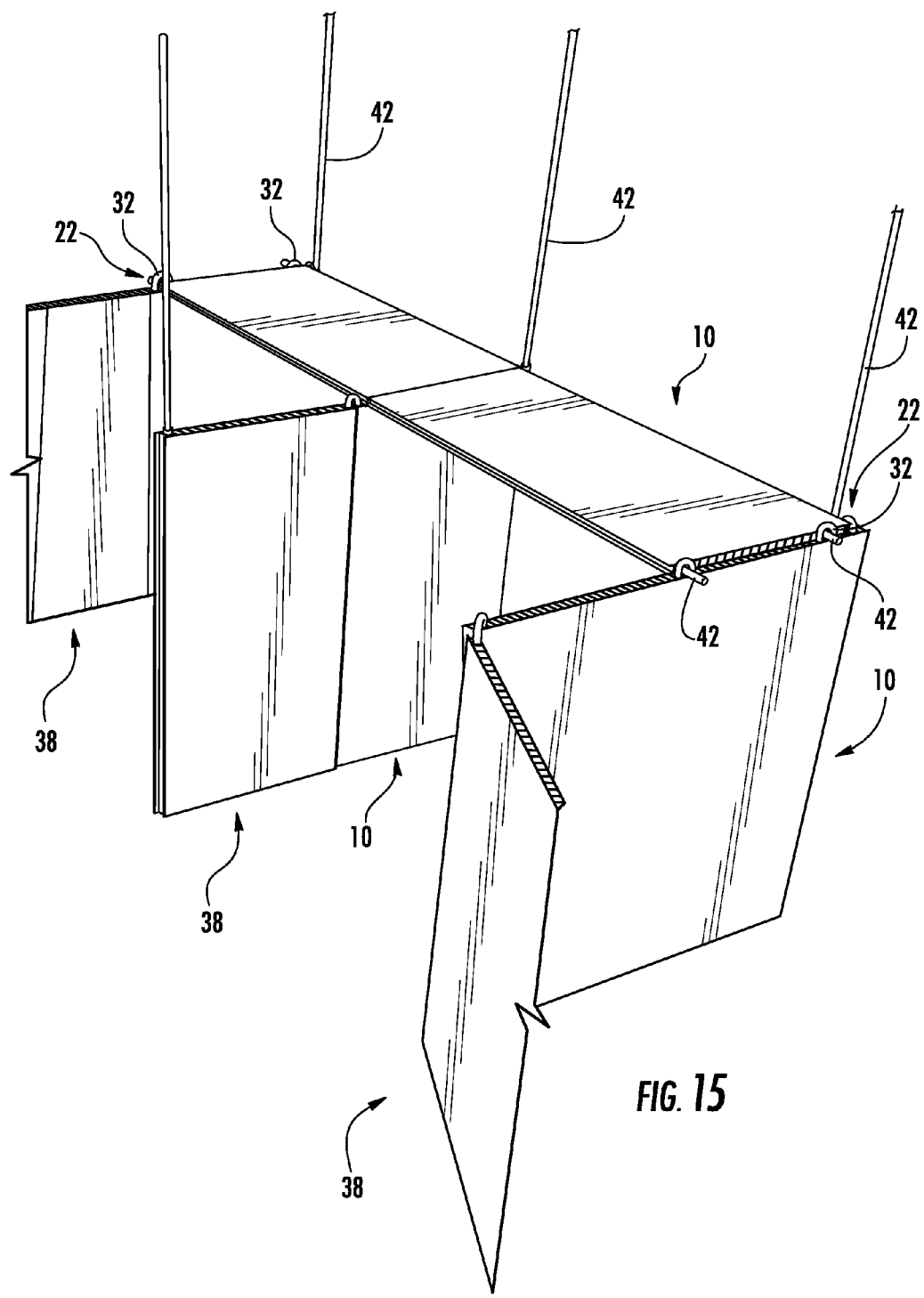
FIG. 15 is a front perspective view of a configuration with the panel construction device, illustrating, in particular, multiple spaces, roofing, and a gate, according to an embodiment of the technology described herein.

In at least one embodiment, poles 42 can be used in a horizontal, or other non-vertical manner. By way of example, and as depicted specifically in FIG. 15, some of the poles 42 are placed horizontally. FIG. 15 includes poles 42 in both vertical and horizontal placement patterns.

In at least one embodiment, the poles are plastic. In at least one embodiment, the poles 42 are fiber glass.

In at least one embodiment, a pole is further configured with a flag 52, banner, or the like. A flag 52 is depicted in the created structure depicted in FIG. 12, for example.

Figure 10:
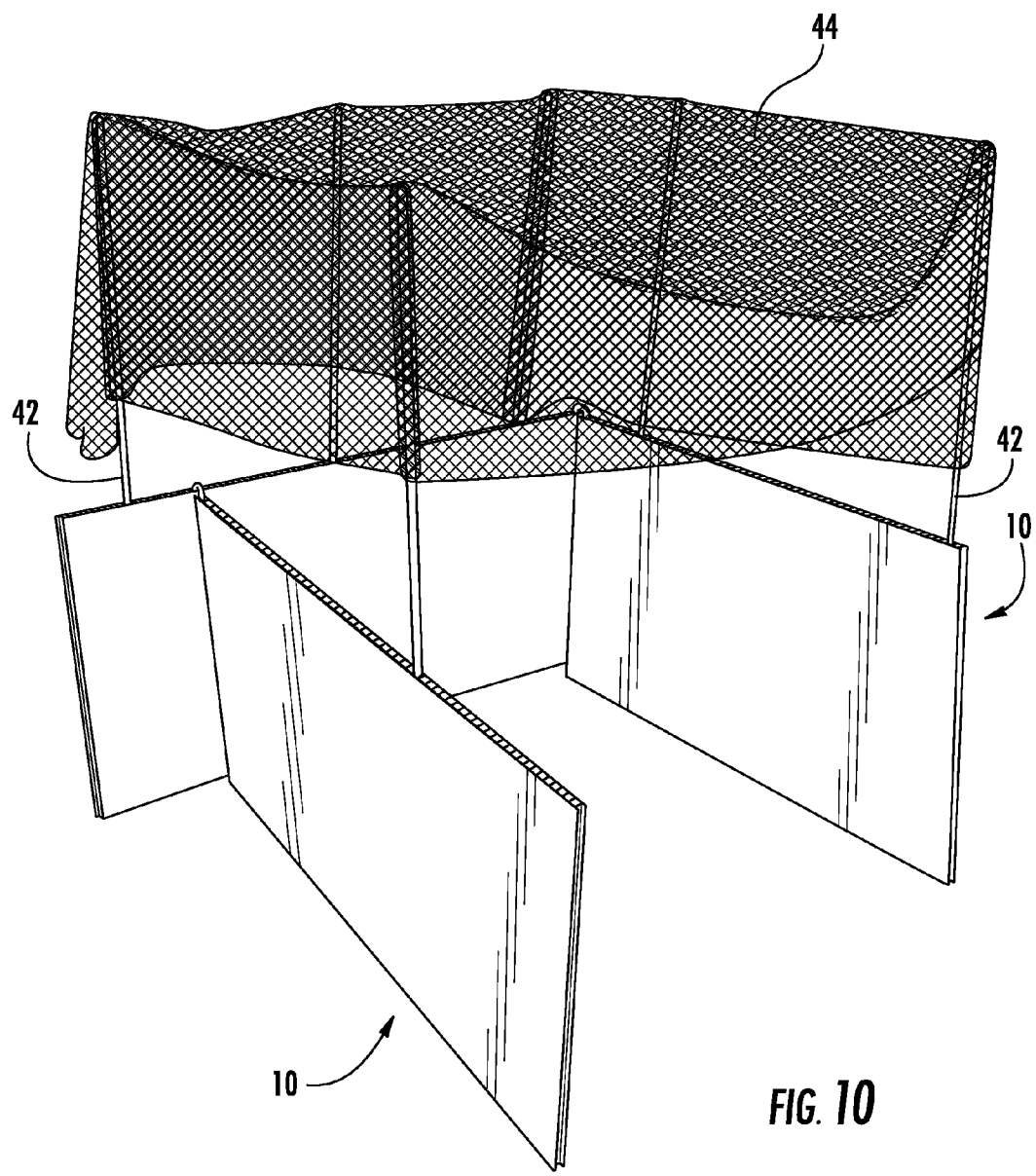
FIG. 10 is a front perspective view of multiple partitions of FIG. 1, and having poles as depicted in FIG. 8, and further illustrating, in particular, a net place upon the poles, according to an embodiment of the technology described herein.
Figure 13:
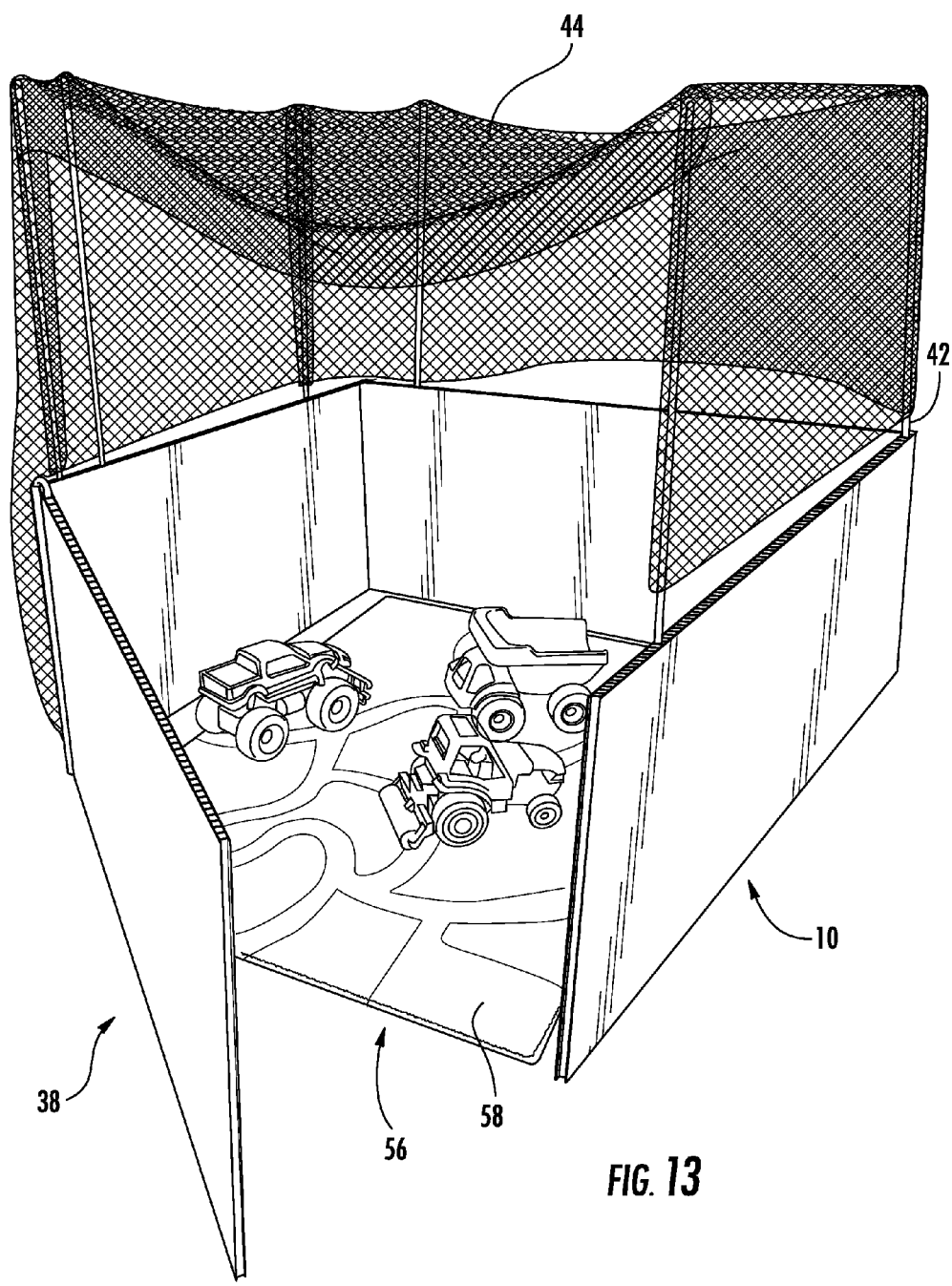
FIG. 13 is a front perspective view of a configuration with the panel construction device, illustrating, in particular, a covered space, a gate, and a floor mat, according to an embodiment of the technology described herein.
Figure 14:
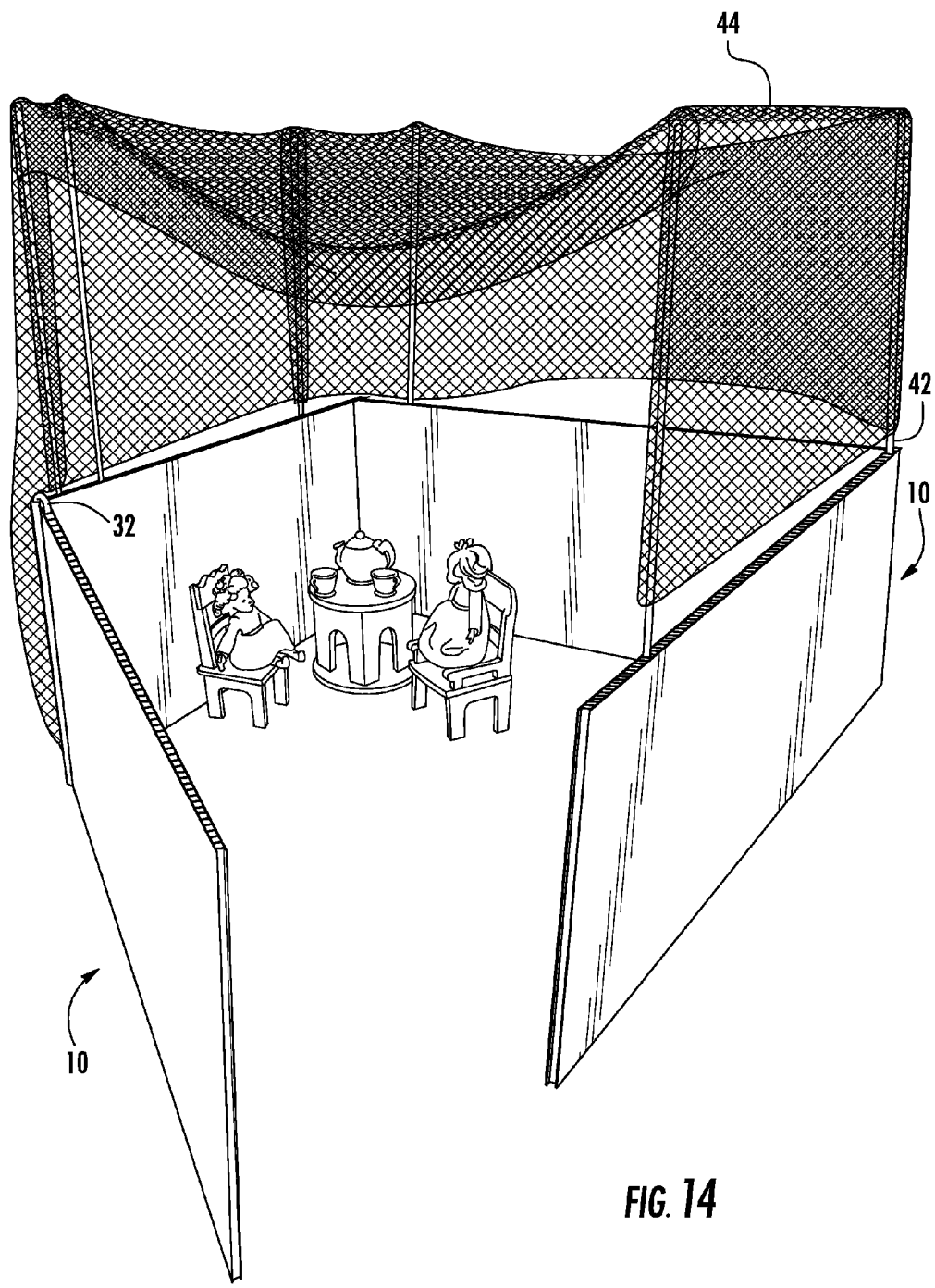
FIG. 14 is a front perspective view of a configuration with the panel construction device, illustrating, in particular, a covered space, a gate, and tea set accessories and furniture, according to an embodiment of the technology described herein.

In at least one embodiment of panel construction device building set assembly 10, the assembly also includes a canopy 10. The canopy 10 can be placed upon panel construction device building set assembly 10 and provide a covering. The canopy is a net in at least one embodiment. The canopy 10 is a solid fabric piece in one embodiment. The canopy 10 can be made of varying materials so long as the materials are child-safe and pet-safe. Reference is made to FIG. 10, for example, in which canopy 10 is a net placed over multiple poles 42 to place a "roofing" or covering over the created building structure of partitions 10. Other canopy 10 configurations are depicted in FIGS. 12, 13, and 14.

In at least one embodiment of panel construction device building set assembly 10, the assembly further includes a window cut-out defined within one or more of the plurality of building partitions 10. By way of example, multiple window cut-outs are depicted in FIG. 12. For example, area 54 provides a cut-out area in which a tunnel structure 48, or the like, can be placed.

In at least one embodiment of panel construction device building set assembly, wherein at least one of the building partitions includes a plurality of vertical cuts on one of either of the first planar surface area or the second planar surface area, the cuts extended from end to end and placed between the plurality of flutes, such that the building partition has greater flexibility and bendability.

In at least one embodiment of panel construction device building set assembly 10, the assembly also includes a floor surface 58. As depicted in set up 56 in FIG. 13, a floor surface 58 is utilized in a building configuration for a room for playing with cars, toys, and so forth. This set up 56 configuration depicted also includes a gate 38 entryway.

Referring now to FIG. 14, a configuration with the panel construction device building assembly 10 is depicted illustrating, in particular, a covered space with net 44, a gate, and tea set accessories and furniture.

Referring now to FIG. 15, a configuration with the panel construction device building assembly 10 is depicted illustrating, in particular, multiple partitioned spaces, roofing, and multiple gates 38.

Figure 16:
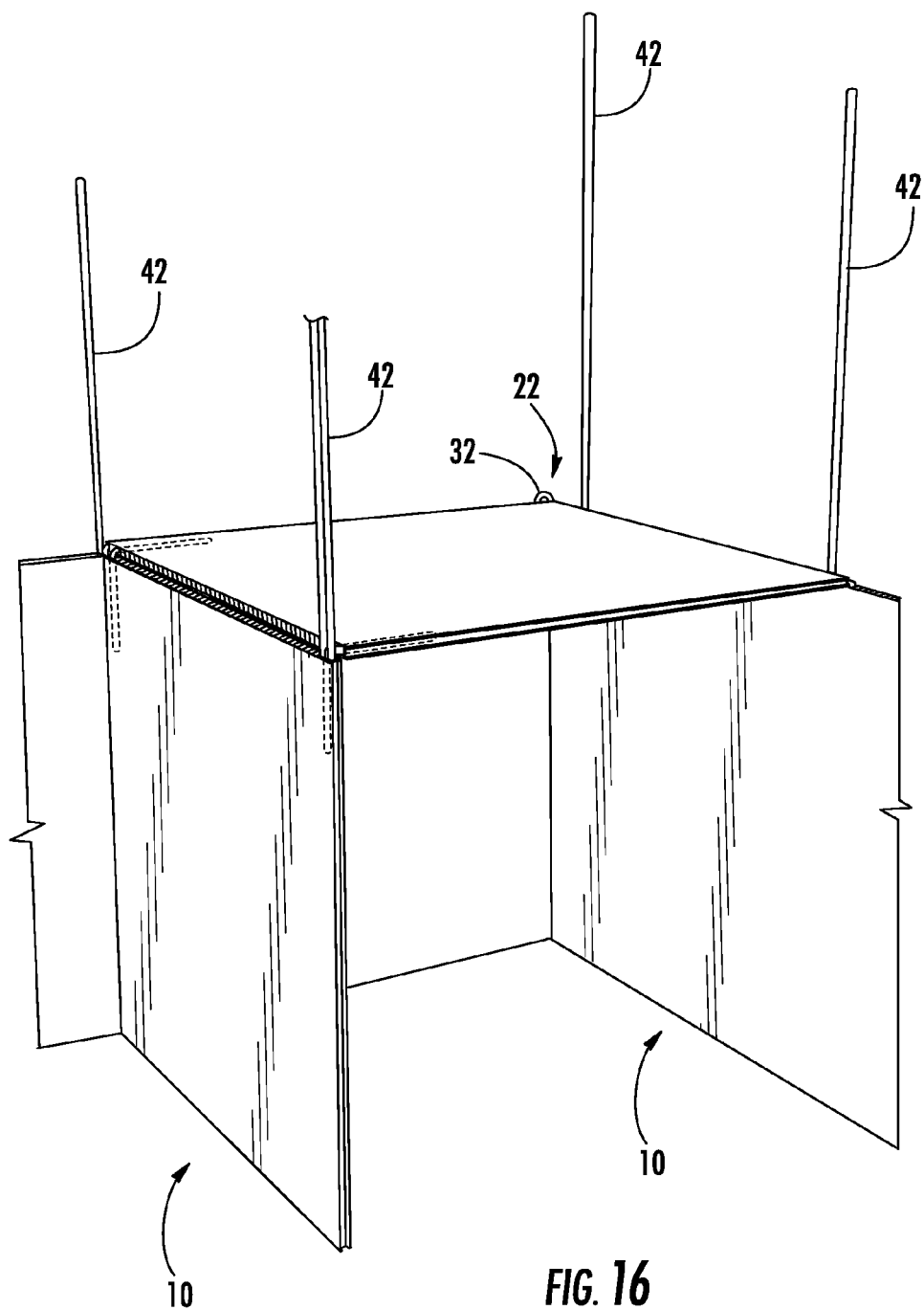
FIG. 16 is a front perspective view of a configuration with the panel construction device, illustrating, in particular, a covered space, roofing, and poles, according to an embodiment of the technology described herein.

Referring now to FIG. 16, a configuration with the panel construction device building assembly 10 is depicted illustrating, in particular, a covered space, roofing, and poles.

Figure 17:
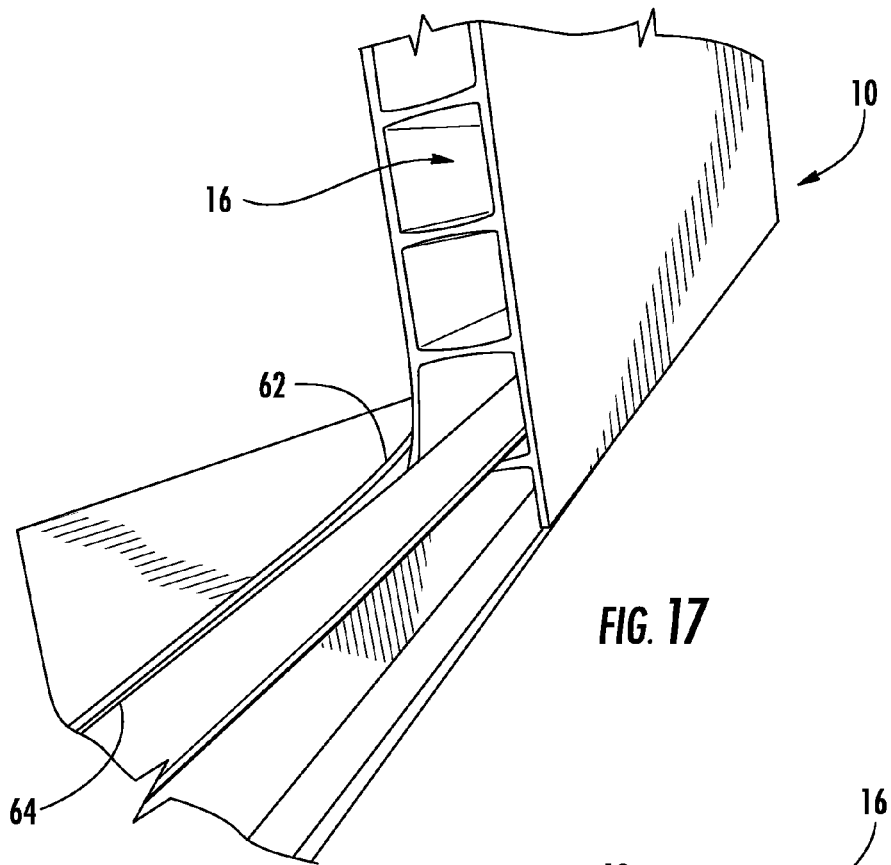
FIG. 17 is an end view of a pair of the partitions depicted in FIG. 1, illustrating, in particular, a means by which the pair of partitions are coupled one to another, according to an embodiment of the technology described herein.
Figure 18:
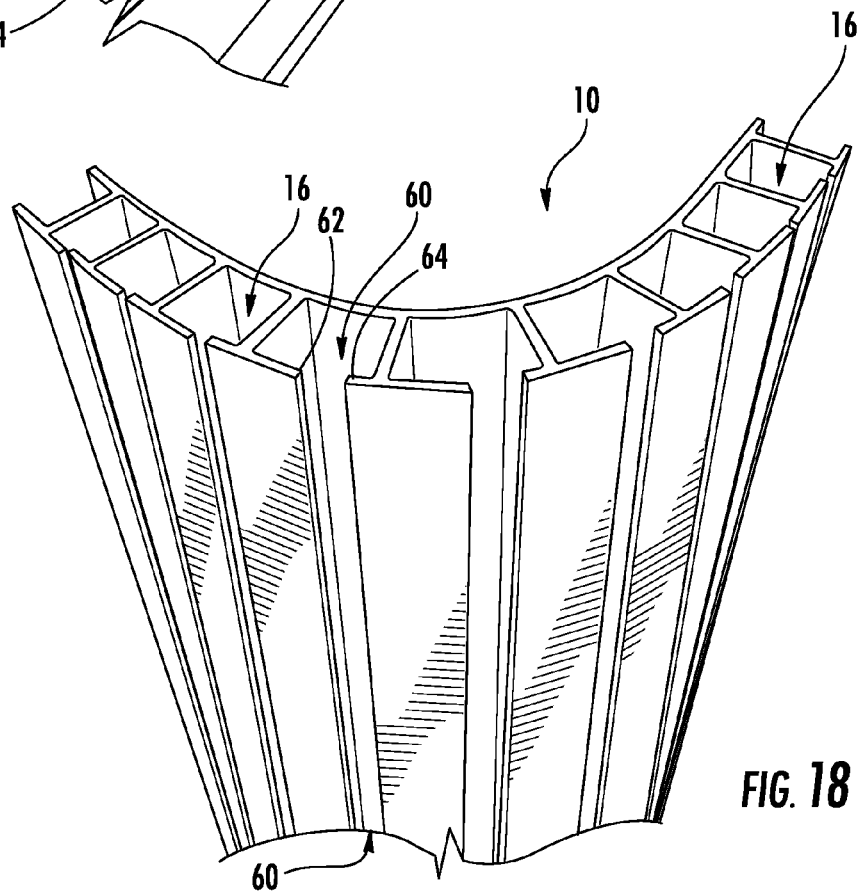
FIG. 18 is a view a partition depicted in FIG. 1, illustrating, in particular, how a side of the partition is cut in between each flute to allow bendability and to provide for coupling to another partition, according to an embodiment of the technology described herein.

Referring now to FIGS. 17 and 18, views of building partitions 10 illustrate how one of the planar surface areas 12, 14 of the building partition 10 is cut in between each flute 19 to allow bendability and to provide for coupling to another building partition 10. An end view of a pair of the partitions 10 is shown illustrating, in particular, a means by which the pair of partitions 10 are coupled one to another. Vertical cuts are made between flutes 19 to one planar side, 12, 14 of the building partition 10. Once the vertical cuts are made to one planar side, 12, 14, new first edge 62 and new second edge 64 area created, as well as gap 60 between them when the building partition 10 is bent or flexed.

Figure 19:
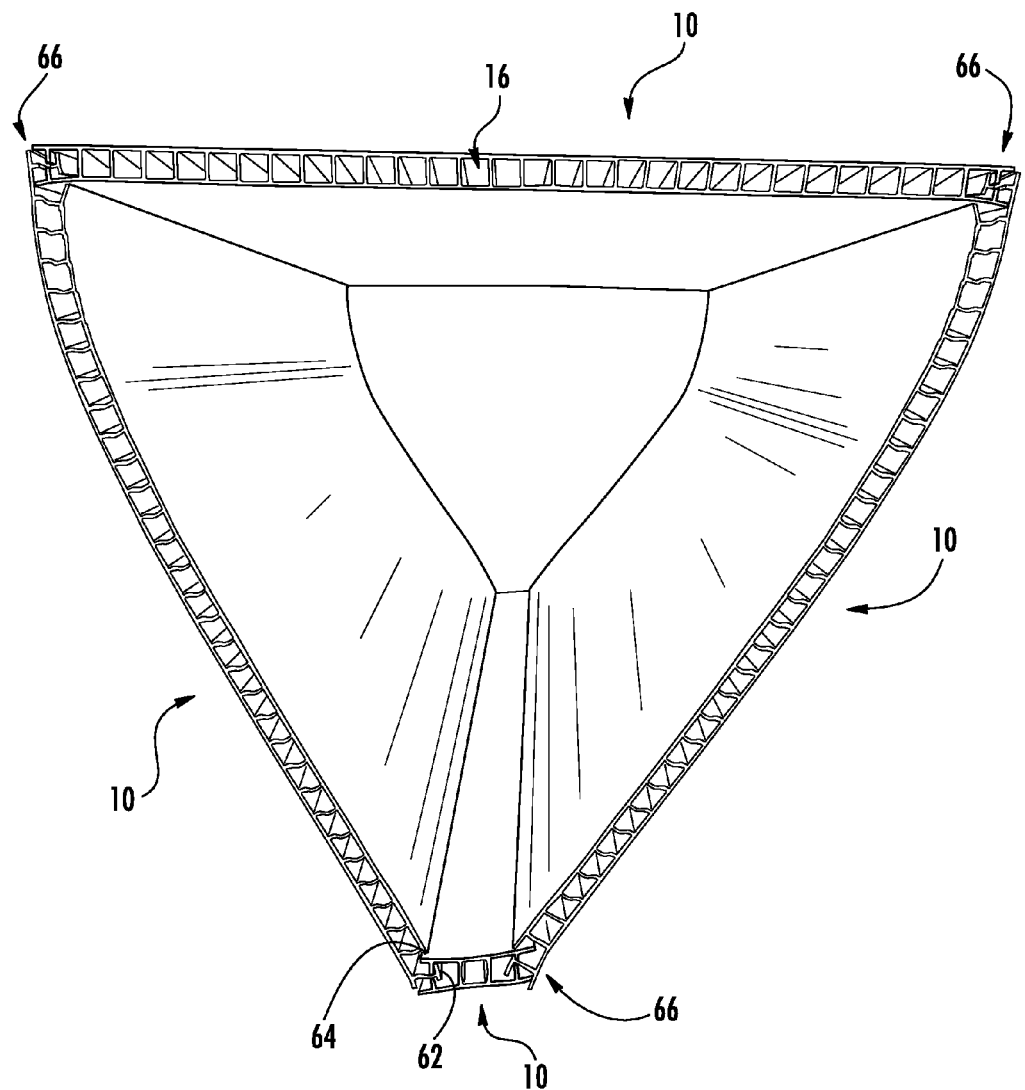
FIG. 19 is a top view of multiple partitions depicted in FIG. 1, illustrating, in particular, the intercoupling of all partitions, and the flexibility of one or more partitions, another partition, according to an embodiment of the technology described herein.

Referring now to FIG. 19, a top view of multiple building partitions 10 illustrates the intercoupling of all building partitions 10, and the flexibility of one or more building partitions 10. As depicted building partitions 10 can be coupled at a joined corner 66 by the intersection of new first edge 62 and new second edge 64. This capability of the panel construction device building set assembly 10 depicted in FIGS. 17, 18, and 19 is useful to create items such as tunnel 48 depicted in FIG. 12.

The panel construction device building assembly 10 can be used in a multiplicity of ways, as personalized by a user, and depending on many design factors. Children can use the assembly for creative purposes, fort building, and so forth. Pets may be temporarily enclosed. Privacy and wind screen may be attained in a version used at the beach, or at a park, for example. The panel construction device building assembly 10 can be used both indoors and outdoors. The panel construction device building assembly 10 can be used with poles, nets, canopies, shelves, table-tops, tunnel, cut-outs, flags, and so forth in various configurations as determined by the user.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the invention and are intended to be covered by the following claims.

What is claimed is:

1. A customizable, interchangeable panel construction device building set assembly for a children's playhouse, pet enclosure, privacy screen, school day care enclosure, fort, or dollhouse as interchangeably selected by the user, the building set assembly comprising:
 a plurality of building partitions, each building partition having:
  a first planar surface area;
  a second planar surface area generally parallel to the first surface area and generally equidistant apart from the first surface area at a predetermined distance;
  a plurality of flutes disposed within the first surface area and the second surface area and generally perpendicular to the first surface area and the second surface area; and
  a corrugated core disposed within each of the plurality of flutes, thereby to create a plurality of hollow channels within the flutes within the first surface area and the second surface area, and wherein each channel runs a continuous length within the first surface area and the second surface area; and
 a plurality of connectors with which to couple a pair of the building partitions one to another;
 a first portion of the plurality of connectors with which to couple a pair of the building partitions one to another is pre-formed in a generally "U" shaped form having two end portions generally parallel one to another, each end for placement within one of the plurality of hollow channels and with which to couple a pair of the building partitions, which are adjacent, one to another;

a customizable, interchangeable partition-based building configuration inhabitable space selectively formed with the plurality of building partitions, the plurality of connectors, and the plurality of "U" shaped connectors thereby for use as a children's playhouse, pet enclosure, privacy screen, school day care enclosure, fort, or dollhouse as interchangeably selected by the user; and an inhabitable interior portion defined within the customizable, interchangeable partition-based building configuration inhabitable space for inhabitation by a child or pet.

2. The panel construction device building set assembly of claim 1, wherein a first portion of the plurality of connectors with which to couple a pair of the building partitions one to another is pre-formed in a generally "U" shaped form having two end portions generally parallel one to another, each end for placement within one of the plurality of hollow channels and with which to couple a pair of the building partitions one to another.

3. The panel construction device building set assembly of claim 1, wherein a second portion of the plurality of connectors with which to couple a pair of the building partitions one to another is pre-formed in a generally "L" shaped form having two end portions generally formed at a ninety degree right angle one to another, each end for placement within one of the plurality of hollow channels and with which to couple a pair of the building partitions one to another.

4. The panel construction device building set assembly of claim 1, wherein a third portion of the plurality of connectors with which to couple a pair of the building partitions one to another further comprises a horizontal aperture formed perpendicular to one end and extended across a width of the end, thereby configured for receipt and pass through of an item placed through the aperture.

5. The panel construction device building set assembly of claim 4, further comprising:

a plurality of flexible spacing elements, each flexible spacing element configured for placement through each connector having an aperture for receipt of an item, and each flexible spacing element configured to securely hold the connector within one of the plurality of hollow channels.

6. The panel construction device building set assembly of claim 1, wherein the plurality of connectors are aluminum.

7. The panel construction device building set assembly of claim 1, wherein the plurality of connectors are plastic.

8. The panel construction device building set assembly of claim 1, wherein the plurality of connectors are powder-coated.

9. The panel construction device building set assembly of claim 1, wherein the plurality of flexible spacing elements are foam.

10. The panel construction device building set assembly of claim 1, wherein the plurality of flexible spacing elements are rubber.

11. The panel construction device building set assembly of claim 1, wherein the plurality of building partitions comprise plastic.

12. The panel construction device building set assembly of claim 1, further comprising:

a first fin defined by a first edge of the first planar surface area; and a second fin defined by a second edge of the second planar surface area;

at least one first cut made along a first length of the first planar surface area between flutes, wherein at least one additional first fin is created; and at least one second cut made along a second length of the second planar surface area between flutes, wherein at least one additional second fin is created.

13. The panel construction device building set assembly of claim 1, further comprising:

a gate configuration formed by at least two of the building partitions generally adjacent and hingedly connected by a pair of connectors, the first connector to couple the at least two building partitions at a top end and the second connector to couple the at least two building partitions at a bottom end.

14. The panel construction device building set assembly of claim 1, further comprising:

a plurality of poles to extend within any one of the plurality of corrugated flutes having corrugated cores between the flutes and to extend the panel construction device building set assembly vertically.

15. The panel construction device building set assembly of claim 1, further comprising:

a canopy to place upon the panel construction device building set assembly and provide a covering.

16. The panel construction device building set assembly of claim 1, further comprising:

a window cut-out defined within one or more of the plurality of building partitions.

17. The panel construction device building set assembly of claim 1, wherein at least one of the building partitions includes a plurality of vertical cuts on one of either of the first planar surface area or the second planar surface area, the cuts extended from end to end and placed between the plurality of flutes, such that the building partition has greater flexibility and bendability.

18. The panel construction device building set assembly of claim 1, further comprising:

a floor surface.

19. A customizable, interchangeable panel construction device building set assembly for a children's playhouse, pet enclosure, privacy screen, school day care enclosure, fort, or dollhouse as interchangeably selected by the user, the building set assembly comprising:

a plurality of building partitions, each building partition having:

a first planar surface area;

a second planar surface area generally parallel to the first surface area and generally equidistant apart from the first surface area at a predetermined distance;

a plurality of flutes disposed within the first surface area and the second surface area and generally perpendicular to the first surface area and the second surface area;

a corrugated core disposed within each of the plurality of flutes, thereby to create a plurality of hollow channels within the flutes within the first surface area and the second surface area, and wherein each channel runs a continuous length within the first surface area and the second surface area;

a plurality of connectors with which to couple a pair of the building partitions one to another;

a first portion of the plurality of connectors with which to couple a pair of the building partitions one to another is pre-formed in a generally "U" shaped form having two end portions generally parallel one to another, each end for placement within one of the plurality of hollow channels and with which to couple a pair of the building partitions, which are adjacent, one to another;

a horizontal aperture defined with a third portion of the plurality of connectors and formed perpendicular to one end and extended across a width of the end, thereby configured for receipt and pass through of an item placed through the aperture; and a plurality of flexible spacing elements, each flexible spacing element configured for placement through each connector having an aperture for receipt of an item, and each flexible spacing element configured to securely hold the connector within one of the plurality of hollow channels;

a customizable, interchangeable partition-based building configuration inhabitable space selectively formed with the plurality of building partitions, the plurality of connectors, and the plurality of "U" shaped connectors thereby for use as a children's playhouse, pet enclosure, privacy screen, school day care enclosure, fort, or dollhouse as interchangeably selected by the user; and an inhabitable interior portion defined within the customizable, interchangeable partition-based building configuration inhabitable space for inhabitation by a child or pet.

20. A customizable, interchangeable panel construction device building set assembly for a children's playhouse, pet enclosure, privacy screen, school day care enclosure, fort, or dollhouse as interchangeably selected by the user, the building set assembly comprising:

a plurality of building partitions, each building partition having:

a first planar surface area;

a second planar surface area generally parallel to the first surface area and generally equidistant apart from the first surface area at a predetermined distance;

a plurality of flutes disposed within the first surface area and the second surface area and generally perpendicular to the first surface area and the second surface area;

a corrugated core disposed within each of the plurality of flutes, thereby to create a plurality of hollow channels within the flutes within the first surface area and the second surface area, and wherein each channel runs a continuous length within the first surface area and the second surface area;

a plurality of connectors with which to couple a pair of the building partitions one to another;

a horizontal aperture defined with a third portion of the plurality of connectors and formed perpendicular to one end and extended across a width of the end, thereby configured for receipt and pass through of an item placed through the aperture;

a plurality of flexible spacing elements, each flexible spacing element configured for placement through each connector having an aperture for receipt of an item, and each flexible spacing element configured to securely hold the connector within one of the plurality of hollow channels;

a plurality of poles to extend within any one of the plurality of corrugated flutes having corrugated cores between the flutes and to extend the panel construction device building set assembly vertically; and a canopy to place upon the panel construction device building set assembly and provide a covering;

wherein a first portion of the plurality of connectors with which to couple a pair of the building partitions one to another is pre-formed in a generally "U" shaped form having two end portions generally parallel one to another, each end for placement within one of the plurality of hollow channels and with which to couple a pair of the building partitions, which are adjacent, one to another;

wherein a second portion of the plurality of connectors with which to couple a pair of the building partitions one to another is pre-formed in a generally "L" shaped form having two end portions generally formed at a ninety degree right angle one to another, each end for placement within one of the plurality of hollow channels and with which to couple a pair of the building partitions one to another; and wherein the third portion of the plurality of connectors with which to couple a pair of the building partitions one to another further comprises a horizontal aperture formed perpendicular to one end and extended across a width of the end, thereby configured for receipt and pass through of an item placed through the aperture;

a customizable, interchangeable partition-based building configuration inhabitable space selectively formed with the plurality of building partitions, the plurality of connectors, and the plurality of "U" shaped connectors thereby for use as a children's playhouse, pet enclosure, privacy screen, school day care enclosure, fort, or dollhouse as interchangeably selected by the user; and an inhabitable interior portion defined within the customizable, interchangeable partition-based building configuration inhabitable space for inhabitation by a child or pet.

* * * * *